US011082313B2

(12) United States Patent
Banikazemi et al.

(10) Patent No.: US 11,082,313 B2
(45) Date of Patent: *Aug. 3, 2021

(54) SCALABLE END-TO-END QUALITY OF SERVICE MONITORING AND DIAGNOSIS IN SOFTWARE DEFINED NETWORKS

(71) Applicant: INTERNATIONAL BUSINESS MACHINES CORPORATION, Armonk, NY (US)

(72) Inventors: Mohammad Banikazemi, New York, NY (US); Hubertus Franke, Cortlandt Manor, NY (US); Bengi Karacali-Akyamac, Bridgewater, NJ (US); John M. Tracey, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,520

(22) Filed: Jul. 10, 2019

(65) Prior Publication Data

US 2019/0334797 A1 Oct. 31, 2019

Related U.S. Application Data

(63) Continuation of application No. 14/949,610, filed on Nov. 23, 2015, now Pat. No. 10,425,302.

(51) Int. Cl.
*G06F 15/173* (2006.01)
*H04L 12/26* (2006.01)
*H04L 12/24* (2006.01)

(52) U.S. Cl.
CPC .......... *H04L 43/08* (2013.01); *H04L 41/5025* (2013.01); *H04L 43/16* (2013.01);
(Continued)

(58) Field of Classification Search
CPC ..... H04L 43/08; H04L 41/5025; H04L 43/16; H04L 43/0876; H04L 43/0858; H04L 43/022
See application file for complete search history.

(56) References Cited

U.S. PATENT DOCUMENTS 6,847,613 B2    1/2005  Mimura et al.
8,422,502 B1 *  4/2013  Alaettinoglu ........... H04L 45/38
                                                 370/392
(Continued)

OTHER PUBLICATIONS

List of IBM Patents or Patent Applications Treated as Related dated Jul. 10, 2019, 2 pages.

*Primary Examiner* — Padma Mundur
(74) *Attorney, Agent, or Firm* — Tutunjian & Bitetto, P.C.; Vazken Alexanian

(57) ABSTRACT

A method for detecting Quality of Service degradation in a network flow includes collecting time series data representing statistical information pertaining to a network flow registered with a network flow monitoring service. The time series data is collected from at least two network elements on a path of the network flow configured to report the time series data. The method further includes indicating Quality of Service degradation in the network flow based on a similarity of the time series data to expected time series data being below a specified similarity threshold, and triggering at least one action to address the similarity being below the specified similarity threshold.

18 Claims, 10 Drawing Sheets

(52) U.S. Cl.
CPC ........ *H04L 43/022* (2013.01); *H04L 43/0858* (2013.01); *H04L 43/0876* (2013.01)

(56) References Cited

U.S. PATENT DOCUMENTS

| | | | |
|---|---|---|---|
| 8,718,064 B2 | 5/2014 | Beliveau et al. | |
| 8,842,578 B1 | 9/2014 | Zisapel et al. | |
| 8,874,589 B1* | 10/2014 | Liu | G06F 17/30867 |
| | | | 707/749 |
| 8,964,752 B2 | 2/2015 | Zhang et al. | |
| 2003/0149919 A1* | 8/2003 | Greenwald | G06F 11/2257 |
| | | | 714/43 |
| 2006/0224537 A1* | 10/2006 | Gonguet | H04L 41/0631 |
| | | | 706/16 |
| 2008/0256230 A1* | 10/2008 | Handley | H04L 63/145 |
| | | | 709/224 |
| 2013/0275567 A1* | 10/2013 | Karthikeyan | H04L 41/0816 |
| | | | 709/221 |
| 2014/0052836 A1 | 2/2014 | Nguyen et al. | |
| 2014/0112150 A1 | 4/2014 | Ko et al. | |
| 2014/0130111 A1* | 5/2014 | Nulty | H04N 17/004 |
| | | | 725/107 |
| 2014/0153396 A1* | 6/2014 | Gopalan | H04L 41/142 |
| | | | 370/235 |
| 2014/0325649 A1 | 10/2014 | Zhang | |
| 2014/0362686 A1 | 12/2014 | Jogalekar et al. | |
| 2015/0063112 A1 | 3/2015 | Wu et al. | |
| 2015/0103642 A1 | 4/2015 | Stuart | |
| 2015/0124583 A1 | 5/2015 | May et al. | |
| 2015/0149613 A1* | 5/2015 | Kakadia | H04L 47/823 |
| | | | 709/224 |
| 2015/0244580 A1* | 8/2015 | Saavedra | H04L 41/0816 |
| | | | 709/221 |
| 2015/0363699 A1* | 12/2015 | Nikovski | G06N 99/005 |
| | | | 706/58 |
| 2017/0373950 A1* | 12/2017 | Szilagyi | H04L 41/5035 |

* cited by examiner

SCALABLE END-TO-END QUALITY OF SERVICE MONITORING AND DIAGNOSIS IN SOFTWARE DEFINED NETWORKS

BACKGROUND

Technical Field

The present invention relates generally to information processing and, in particular, to scalable end-to-end Quality of Service (QoS) monitoring and diagnosis in Software Defined Networks (SDNs).

Description of the Related Art

While many network monitoring techniques/tools are available commercially and discussed in the literature, the monitoring of heterogeneous, large-scale network flows efficiently and accurately (i.e., without impacting the very network measured) suffers from significant limitations. Typically, existing monitoring techniques monitor the network infrastructure and the network devices and focus on service outages or black-outs. The monitoring of brown-outs, i.e., networks problems that degrade application performance without causing a complete failure are much harder to detect since they require large scale flow monitoring. Such flow monitoring (irrespective of whether active or passive) puts stress on the monitored network and there is a trade-off between overhead and accuracy. Furthermore, solutions that rely on instrumenting applications are not applicable to all network flows.

To improve cloud and network management, an application-agnostic, scalable monitoring solution that seamlessly applies to a diverse set of flows seamlessly is needed. The solution should provide visibility on the end-to-end performance accurately and with minimal overhead without impacting the underlying network.

SUMMARY

According to an aspect of the present principles, a method is provided for detecting a Quality of Service degradation in a network flow. The method includes configuring, by a monitoring element, at least two network elements on a path of a network flow to report statistical information pertaining to the network flow as time series data. The method further includes collecting, by the monitoring element, the time series data from the network elements. The method also includes computing, by the monitoring element, a similarity of the time series data. The method additionally includes indicating, by the monitoring element, the Quality of Service degradation when the similarity is below a specified similarity threshold.

According to another aspect of the present principles, a method is provided for detecting a Quality of Service degradation in a network flow. The method includes configuring a network switch on a path of a network flow to report statistical information pertaining to the network flow as time series data. The method further includes collecting the time series data from the switch. The method also includes identifying a model representative of an expected behavior of the network flow. The method additionally includes computing a similarity of the time series data to data generated by the model. The method further includes indicating the Quality of Service degradation when the similarity is below a specified similarity threshold.

According to yet another aspect of the present principles, a system is provided for detecting a Quality of Service degradation in a network flow. The system includes a hardware, processor-based monitoring element, configured to configure at least two network elements on a path of a network flow to report statistical information pertaining to the network flow as time series data. The hardware, processor-based monitoring element is further configured to collect the time series data from the network elements. The hardware, processor-based monitoring element is also configured to compute a similarity of the time series data. The hardware, processor-based monitoring element is additionally configured to indicate the Quality of Service degradation when the similarity is below a specified similarity threshold.

According to an aspect of the present principles, a method is provided for detecting Quality of Service degradation in a network flow. The method includes collecting, by a monitoring element, time series data representing statistical information pertaining to a network flow registered with a network flow monitoring service. The time series data is collected from at least two network elements on a path of the network flow configured to report the time series data. The method further includes indicating, by the monitoring element, Quality of Service degradation in the network flow based on a similarity of the time series data to expected time series data being below a specified similarity threshold, and triggering, by the monitoring element, at least one action to address the similarity being below the specified similarity threshold.

According to another aspect of the present principles, a method is provided for detecting Quality of Service degradation in a network flow. The method includes collecting, by a monitoring element, time series data representing statistical information pertaining to a network flow registered with a network flow monitoring service. The time series data being collected from a switch on a path of the network flow configured to report the time series data. The method further includes identifying, by the monitoring element, a model representative of an expected behavior of the network flow, indicating, by the monitoring element, Quality of Service degradation in the network flow based on a similarity of the time series data to expected time series data being below a specified similarity threshold, and triggering, by the monitoring element, at least one action to address the similarity being below the specified similarity threshold.

According to yet another aspect of the present principles, a system is provided for detecting a Quality of Service degradation in a network flow. The system includes a hardware, processor-based monitoring element, configured to collect time series data representing statistical information pertaining to a network flow registered with a network flow monitoring service. The time series data is collected from at least two network elements on a path of the network flow configured to report the time series data. The hardware, processor-based monitoring element is further configured to indicate Quality of Service degradation in the network flow based on a similarity of the time series data to expected time series data being below a specified similarity threshold, and trigger at least one action to address the similarity being below the specified similarity threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to scalable end-to-end Quality of Service (QoS) monitoring and diagnosis in Software Defined Networks (SDNs).

Advantageously, the present principles address the problem of monitoring the Quality of Service (QoS) provided by Internet Protocol (IP) networks as well as the problem of diagnosing problems relating thereto. With the diverse set of applications running in the cloud and data centers, QoS monitoring can be a very important feature.

In an embodiment, the present principles provide a scalable application-agnostic monitoring technique to identify network flows experiencing QoS problems. In an embodiment, the technique can exploit the Software Defined Networking (SDN) features of centralized network knowledge, control and ability to tap into network elements to collect per flow traffic measurements.

In an embodiment, the present principles collect low-grade traffic characteristics pertaining to network flows at multiple locations in the network without significantly impacting the very network that is being monitored and analyzes the collected data to quickly identify flows exhibiting anomalies. The technique can be used by itself or in conjunction with other techniques to trigger more thorough diagnostic tools. In an embodiment, the present principles can be used in real-time to initiate corrective action during times of network trouble.

The present principles are more scalable than current start of the art techniques. In an embodiment, scale is achieved by (a) intelligent sampling (low-grade probing) to handle large scale traffic with acceptable accuracy, (b) a light-weight analysis that provides increasing confidence over time and (c) the ability to aggregate flows with the same network paths.

The present principles are applicable to any application without any instrumentation as the present principles rely on low-level flow traffic information. Furthermore, the proposed measurement technique relies on traffic analysis to derive end-to-end quality metrics without any active probing. The present principles do not require clock synchronization between the sources of traffic information.

The proposed technique helps in identifying the portions of the network responsible for problems. This can be achieved by (a) collecting traffic statistics from intermediate nodes on a flow's network path and/or (b) analyzing the end-to-end flows experiencing problems and comparing path information to detect common segments between the paths of flows with QoS degradation.

Figure 1:
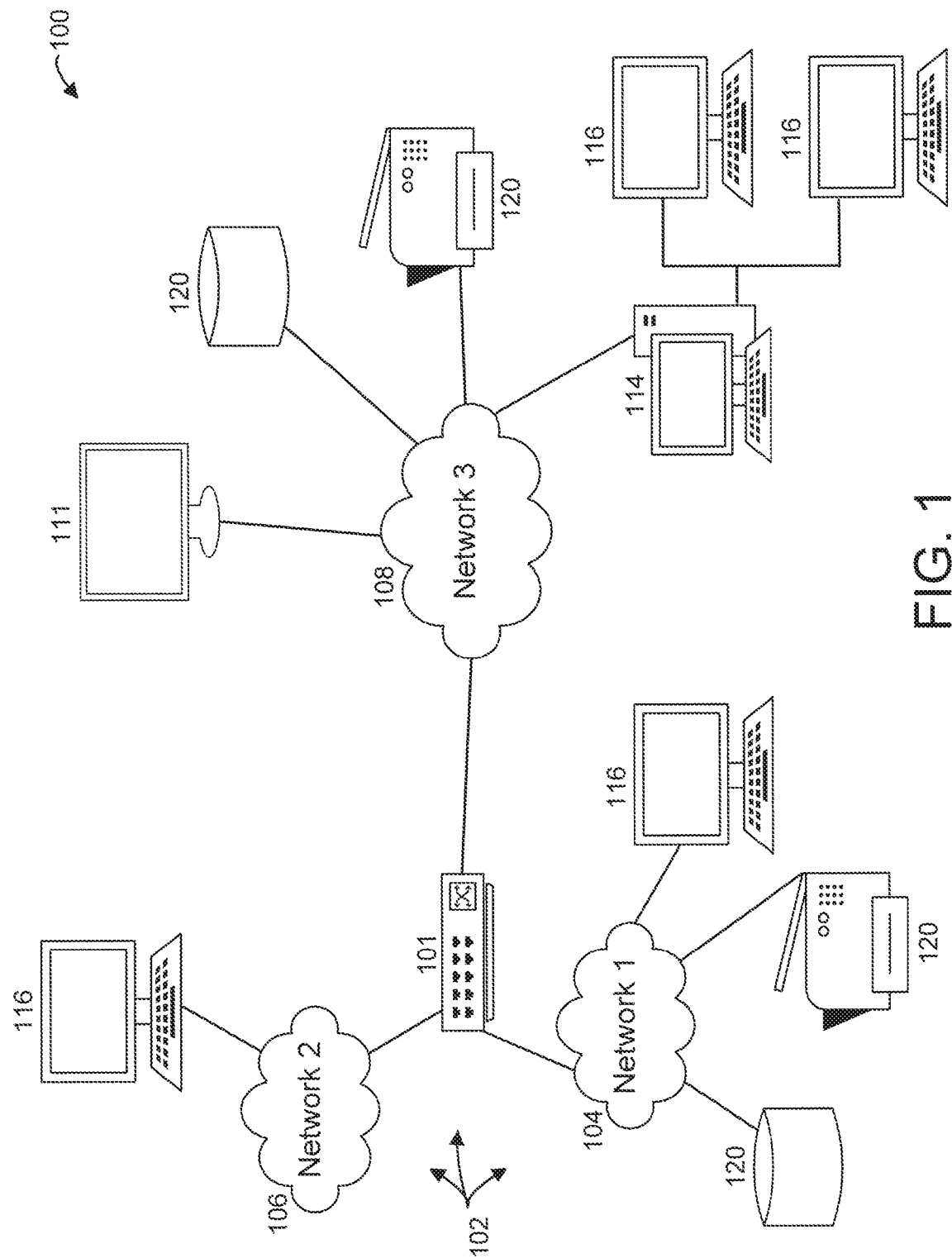
FIG. 1 illustrates a network architecture 100 to which the present principles can be applied, in accordance with an embodiment of the present principles.

FIG. 1 illustrates a network architecture 100 to which the present principles can be applied, in accordance with an embodiment of the present principles. As shown in FIG. 1, a plurality of remote networks 102 are provided including a first remote network 104 and a second remote network 106. A gateway 101 may be coupled between the remote networks 102 and a proximate network 108. In the context of network architecture 100, the networks 104, 106 may each take any form including, but not limited to a LAN, a WAN such as the Internet, a public switched telephone network (PSTN), an internal telephone network, and so forth.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud". In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
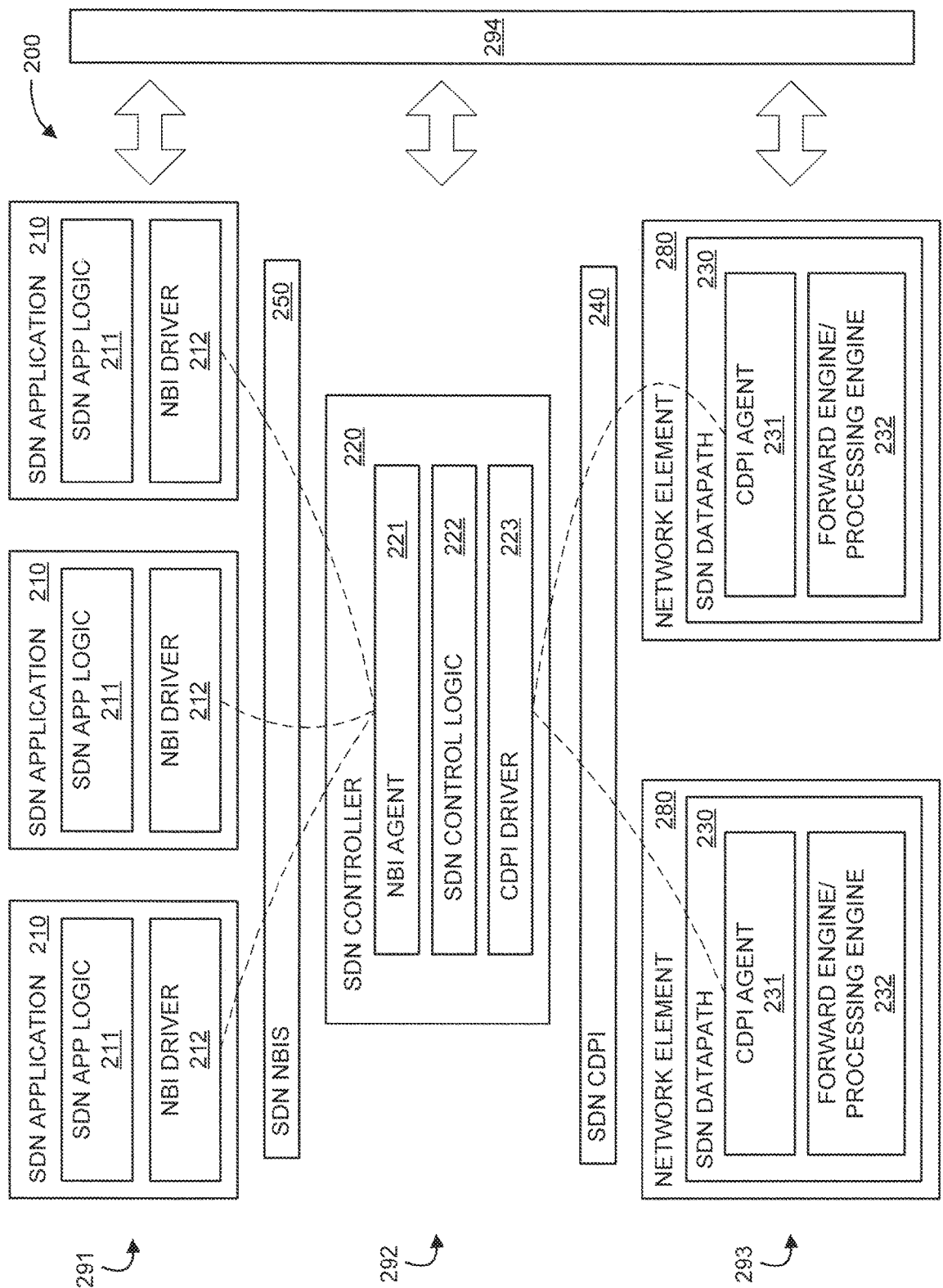
FIG. 2 shows an exemplary architecture 200 for a Software Defined Network (SDN), in accordance with an embodiment of the present principles.

FIG. 2 shows an exemplary architecture 200 for a Software Defined Network (SDN), in accordance with an embodiment of the present principles. The system 200 includes an application plane 291, a control plane 292, a data plane 293, and a management and administration plane 294.

The system 200 includes SDN applications 210, an SDN controller 220, SDN Datapaths 230, an SDN Control to Data-Plane Interface (CDPI) 240, and SDN Northbound Interfaces (NBI) 250.

The SDN Applications 210 are programs that explicitly, directly, and programmatically communicate their network requirements and desired network behavior to the SDN Controller 220 via a northbound interface (NBI). In addition, the SDN Applications 210 can consume an abstracted view of the network for their internal decision making purposes. Each of the SDN Applications can include an SDN Application (APP) Logic 211 and one or more NBI Drivers 212. The SDN Applications 210 can themselves expose another layer of abstracted network control, thereby offering one or more higher-level NBIs through respective NBI agents.

The SDN Controller 220 translates the requirements from the SDN Application layer down to the SDN Datapaths and provides the SDN Applications 210 with an abstract view of the network (which may include statistics and events). The SDN Controller 220 includes one or more NBI Agents 221, an SDN Control Logic 222, and a Control to Data-Plane Interface (CDPI) driver 223.

In an embodiment, the SDN controller 220 is a logically centralized entity. However, in another embodiment, a set of multiple SDN controllers can be used. The controllers can be connected in a hierarchical or peer to peer configuration. Communication interfaces can be used between the controllers. Virtualization or slicing of network resources can be performed in consideration of the controllers.

The SDN Datapaths 230 are logical network devices that expose visibility and uncontended control over its advertised forwarding and data processing capabilities. The logical representation may include all or a subset of the physical substrate resources. An SDN Datapath 230 includes a CDPI agent 231 and a set of one or more traffic forwarding engines and zero or more traffic processing functions (the traffic forwarding engines and traffic processing engines collectively denoted herein by the reference numeral 232). These engines and functions 232 may include simple forwarding between the datapath's external interfaces or internal traffic processing or termination functions. One or more SDN Datapaths 230 can be included in a single (physical) network element, as an integrated physical combination of communications resources, managed as a unit. An SDN Datapath 230 can also be defined across multiple physical network elements. The SDN Datapath 230 can be implemented to involve one or more of the following: logical to physical mapping; management of shared physical resources; virtualization or slicing of the SDN Datapath; interoperability with non-SDN networking; and data processing functionality. The SDN Datapaths 230 are included within network elements 280.

The SDN CDPI 240 is the interface defined between an SDN Controller and an SDN Datapath, which provides at least (i) programmatic control of forwarding operations, (ii) capabilities advertisement, (iii) statistics reporting, and (iv) event notification. One value of SDN resides in the expectation that the CDPI 240 is implemented in an open, vendor-neutral and interoperable way.

The SDN NBIs 250 are interfaces between the SDN Applications 210 and the SDN Controller(s) 220 and typically provide abstract network views and enable direct expression of network behavior and requirements. This may occur at any level of abstraction (latitude) and across different sets of functionality (longitude). One value of SDN resides in the expectation that these interfaces are implemented in an open, vendor-neutral and interoperable way.

The SDN applications 210 exist in the application plane 291 and communicate their requirements via their NBI drivers 212. The control plane 292 includes the SDN controller 220 that translates these requirements and exerts control over the SDN Datapaths 230 while providing relevant information to the SDN applications 210. The data plane 293 includes network elements 280 whose SDN Datapaths 230 expose their capabilities through their CDPI agents 231. The management and administration plane 294 sets up the network elements 280, assigns the SDN Datapaths 230 to their SDN controller 220, and configures control policies regarding control afforded to the SDN controller 220 and/or any of the SDN applications 210.

In the embodiment shown in FIG. 2, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, while only one SDN controller is shown, other embodiments can involve multiple SDN controllers. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

Moreover, it is to be appreciated that system 200 described with respect to FIG. 2 is a system for implementing respective embodiments of the present principles. One or more of the elements of system 100 may be used with one or more elements of system 200.

In an embodiment, key characteristics of a network flow's traffic pattern are extracted and these light-weight features are used to pair-wise compare traffic patterns collected at multiple locations for anomaly detection.

Under normal network conditions, (i.e., no packet loss and no excessive delay due to network degradation), traffic patterns sampled at two locations on the flow's path are similar except by an offset in time. Any discrepancy between such traffic patterns indicate an anomaly such as increased delay or packet loss.

Figure 3:
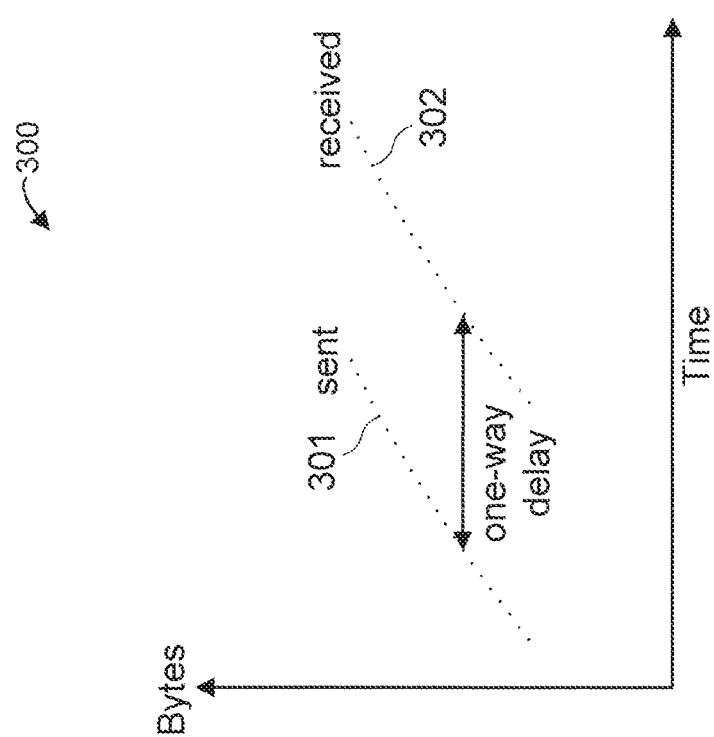
FIG. 3 shows exemplary traffic patterns 300 of a network flow captured at two locations, to which the present principles can be applied, in accordance with an embodiment of the present principles.

FIG. 3 shows exemplary traffic patterns 300 of a network flow captured at two locations, to which the present principles can be applied, in accordance with an embodiment of the present principles. The traffic patterns 300 include a sent pattern (hereinafter "sent curve") 301 and a received pattern (hereinafter "received curve") 302.

In the example of FIG. 3, the first location is the first switch on the sending side and the second one is the last switch close to the receiving side. The traffic pattern metric used in this example is bytes over time. However, the present principles are not limited to only the preceding traffic pattern metric and, thus, other metrics can also be used, while maintaining the spirit of the present principles. Suppose every packet pertaining to the flow is used to build the curves in FIG. 3 and each packet's addition to the traffic metric is shown by the dots. Every point on the sent curve 301 and received curve 302 indicates the total number of bytes sent or received at a given time, respectively, forming time-series data. Under normal network conditions, the two curves 301 and 302 have a similar shape and can be aligned on top of each other by removing the time offset. The similarity of these two curves 301 and 302 can be determined using time series analysis. When there is no anomaly (i.e., no packet loss or excessive delay), the curves 301 and 302 are very similar indicating that the traffic patterns match well. Conversely, less similarity between the curves 301 and 302 indicates an anomaly. The similarity level threshold for detecting an anomaly can be a parameter. Furthermore, detailed information about the flow (if available) can be utilized to customize this threshold to different types of flows (i.e., Transmission Control Protocol (TCP), User Datagram Protocol (UDP), and so forth). Knowledge of the application characteristics, while not necessary, would help determine a suitable threshold. For example, a 1% packet loss over a minute may not be critical for a TCP application, but would be unacceptable for the real-time transportation of voice or video traffic.

In the above example, fine grained traffic statistics are collected for accurate anomaly detection at the expense of high overhead. However, anomalies can be detected more efficiently and in a more scalable fashion using only a subset of the data.

Figure 4:
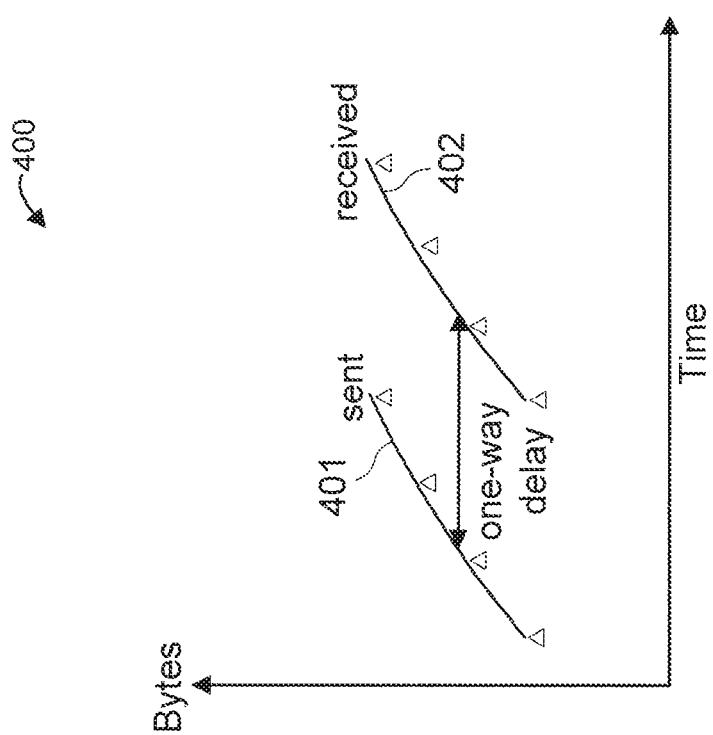
FIG. 4 shows exemplary reduced traffic patterns 400 of a network flow captured at two locations, to which the present principles can be applied, in accordance with an embodiment of the present principles.

FIG. 4 shows exemplary reduced traffic patterns 400 of a network flow captured at two locations, to which the present principles can be applied, in accordance with an embodiment of the present principles. The reduced traffic patterns 400 include a sent pattern (hereinafter "sent curve") 401 and a received pattern (hereinafter "received curve") 402.

In FIG. 4, the triangles indicate sampling times and the traffic patterns inferred using only the sampled data are shown with solid lines connecting the arrows. In an embodiment, the observation is exploited that using these reduced traffic patterns, similar analysis can be conducted to detect anomalies in a scalable manner and with acceptable accuracy. Hence, in an embodiment, reduced traffic characteristics are extracted by low-grade sampling of key metrics and analyzes the similarity level between a pair of traffic patterns. In an embodiment, the accuracy of the analysis is preserved by using metrics that can be sampled without significant loss (i.e., full traffic characteristics can be inferred using the reduced form with acceptable accuracy). Examples of metrics capable of being used in accordance with the present principles include, but are not limited to, total bytes over time, number of packets over time, packet sequence numbers (if available) over time per flow, and so forth. For example, NetFlow or IPFIX supported by Open vSwitch provide such per flow counters/metrics. Note that the present principles do not require time synchronization between data sources.

It is to be appreciated that the traffic flow data used by the present principles can be "summarized" for use in accordance with the teachings of the present principles. For example, in an embodiment, the traffic flow data can be summarized via sampling, e.g., only every N-th packet is collected rather than collecting every packet. There are MANY other ways to summarize. In an embodiment, a packet can be summarized by the number of bytes of payload it contains or by a hash of its entire contents or a hash of its data. In an embodiment, a summary can be defined by the number of data packets it includes. For TCP traffic, another way is to extract the sequence and acknowledgement numbers to which the packet corresponds. Thus, any approach capable of summarizing and/or otherwise reducing the overhead of the data used by the similarity approach of the present principles can be used in accordance with the present principles. That is, the preceding are some of many ways in which data can be summarized for use in accordance with the present principles and, thus, any other approaches to reduce the amount of traffic flow data can also be used, while maintaining the spirit of the present principles.

The present principles provide a screening test that is light-weight (e.g., has a low overhead) and can be used by itself or in conjunction with other more thorough diagnosis tools. In an embodiment, the present principles can be used for real-time operations and support triggering QoS assurance mechanism in cases where a flow is detected to have a severe problem. In an embodiment, the present principles are applicable to offline analysis of large-scale data to detect anomalies as well.

Figure 5:
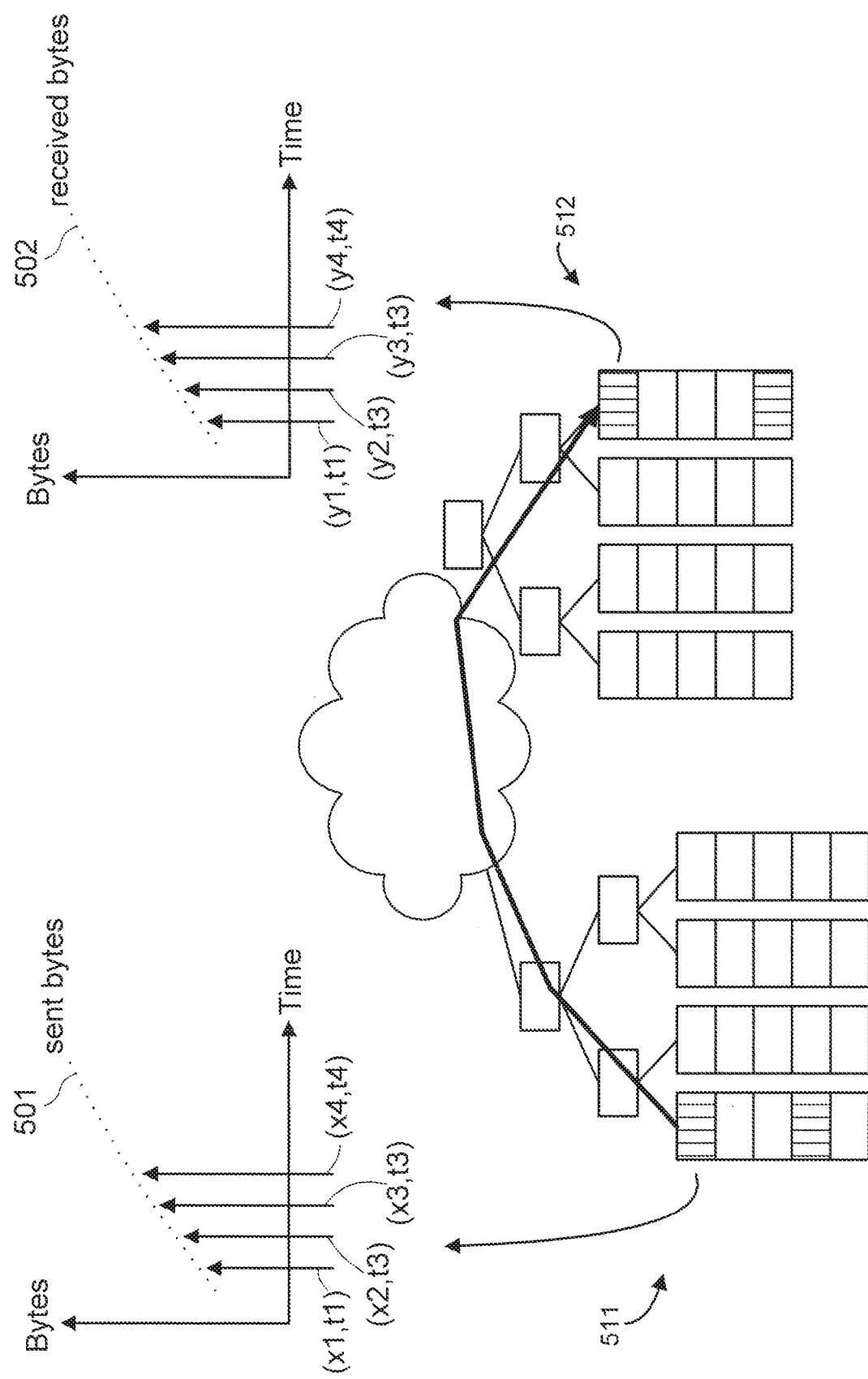
FIG. 5 shows an example flow and the path taken by the flow's traffic in a network, in accordance with an embodiment of the present principles.

FIG. 5 shows an example flow and the path taken by the flow's traffic in a network, in accordance with an embodiment of the present principles. Rectangles indicate network elements (e.g., forwarding elements such as, e.g., switches or routers). These elements are connected by a cloud which can be a WAN or part of the data center network. The virtual machines sending and receiving the flow are marked with hatching. In this example, the forwarding elements at the source and the destination of the flow are tapped to collect statistics about the sent and received traffic, respectively.

In FIG. 5, the plot 501 of sent bytes and the plot 502 of received bytes indicate a monotonously increasing function over time. Hence, reduced traffic patterns can provide accurate anomaly detection with low-grade sampling. Each arrow in FIG. 5 indicates a measurement point where a per flow statistic is collected. At each measurement point on the sending side, tuples $<x_i, t_i>$ are collected such that $x_i$ is the sent bytes at time $t_i$. Similarly, for received traffic tuples $<y_i, t_i>$ would be collected where $y_i$ is the bytes received at time $t_i$.

The example in FIG. 5 shows forwarding elements 511 and 512 that provide per flow traffic information. Typically, other intermediate network elements on the path of the flow can also support the reporting of flow level traffic information. Such data from any network element on the path helps locate the part of the network responsible from problems. Traffic pattern collection at additional locations can be initiated on demand after the flow is flagged to exhibit anomalies. The analysis would include additionally comparing the traffic pattern observed at an intermediate network element to the traffic patterns observed at both the source and destinations.

For example, presume that the measurement technique indicated an anomaly between the source forwarding element 511 and the destination forwarding element 512. Additionally, presume that the traffic patterns between the source and an intermediate network element match well. In this case, the network problem can be attributed to the part of the network between the intermediate node and the destination even without requiring any analysis comparing the traffic patterns between the intermediate node and the destination. Note that decisions to collect additional information from intermediate nodes can be made on-demand and the software defined network can provide this functionality.

In an embodiment, an implementation of the present principles can include the following elements: a monitoring element; and forwarding elements.

The monitoring element can implement a monitoring service to perform QoS monitoring as described herein. An entity can be used for the monitoring element that collects/analyses, and manages the data. The monitoring service can be configured with flows of interest. These flows could be user specified or heuristics could be used to select them. The monitoring service collects traffic information and conducts analysis to identify flows experiencing problems. For each flow of interest, the monitoring service maintains reduced traffic patterns over time. In an embodiment, the monitoring element can be implemented by, for example, the CDPI agent 230 and the SDN controller 220 shown and described with respect to FIG. 2. For example, in an embodiment, the CDPI agent 230 can collect statistical information pertaining to one or more flows, and the collected statistical information can be analyzed by the SDN controller 220. Of course, other elements of FIG. 2 can also be tasked with these functions, while maintaining the spirit of the present principles.

The forwarding elements can be real or virtual and they provide traffic statistics pertaining to individual flows. These forwarding elements report their statistics to the monitoring service periodically. The parameters of the reporting interval and the flows of interest are configured on-demand. The forwarding elements involved in carrying flows of interest can be known in a variety of ways, including specification from the SDN environment or discovered by the monitoring system. The forwarding elements can be configured to upfront to monitor flows of interest or they can be configured on demand when they encounter a new flow that is of interest. Of course, while forwarding elements such as switches are described in one or more examples as being the providers of traffic statistics pertaining to the flows, other network elements can also be used to provide the traffic statistics pertaining to the flows while maintaining the spirit of the present principles. For example, routers, gateways, and so forth can also be used. In an embodiment, the switches (and/or other network elements) can be the network elements 280 shown and described with respect to FIG. 2.

Figure 6:
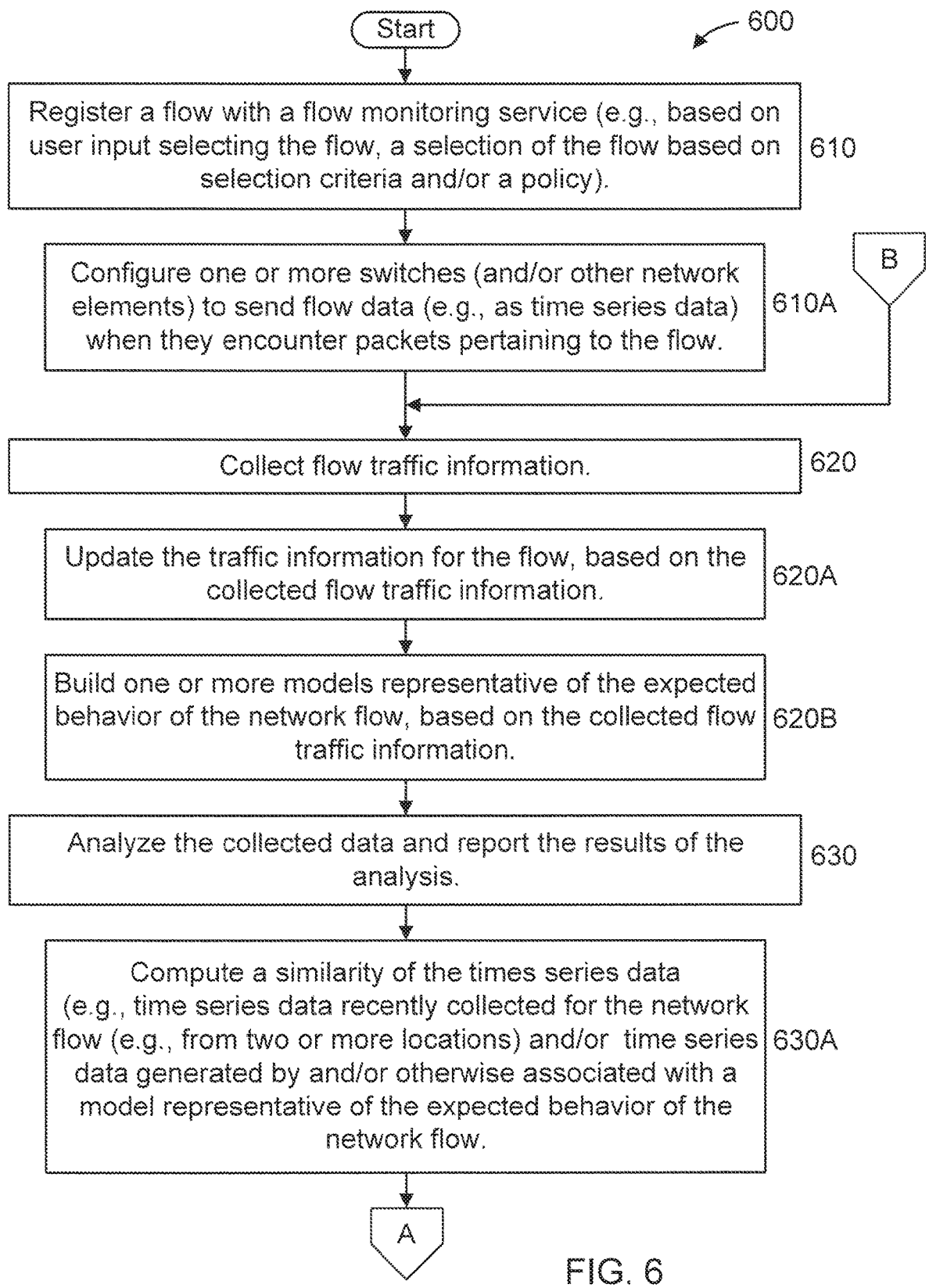
FIGS. 6-7 show an exemplary method 600 for scalable end-to-end Quality of Service (QoS) monitoring and diagnosis in Software Defined Networks (SDNs), in accordance with an embodiment of the present principles.
Figure 7:
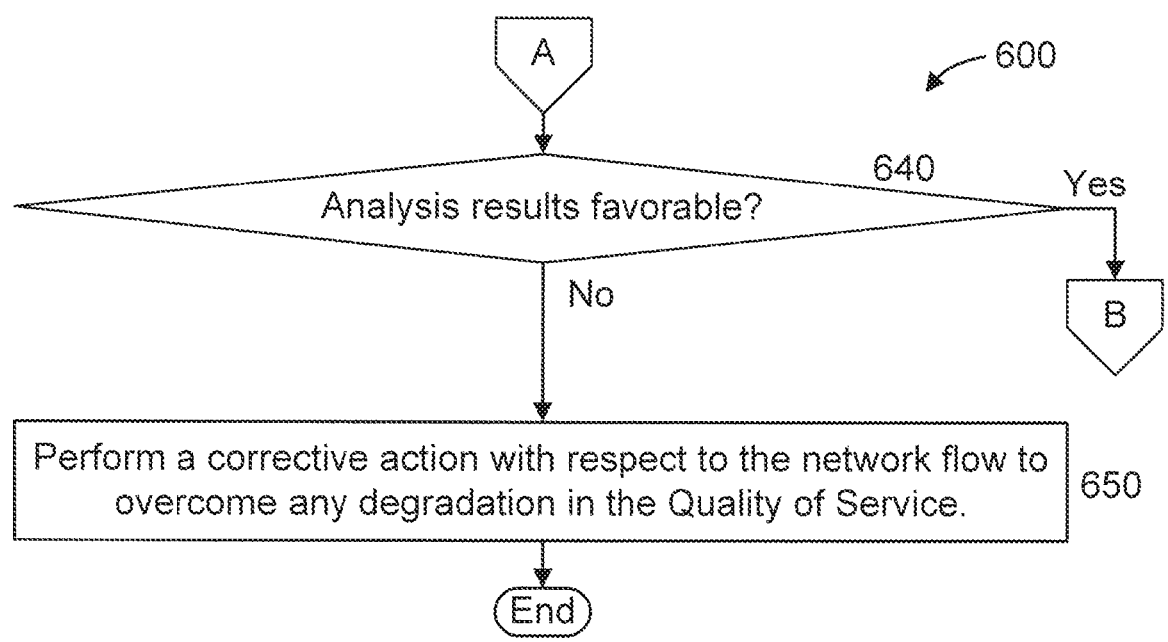

FIGS. 6-7 show an exemplary method 600 for scalable end-to-end Quality of Service (QoS) monitoring and diagnosis in Software Defined Networks (SDNs), in accordance with an embodiment of the present principles.

At step 610, register a flow with a flow monitoring service.

It is to be appreciated that step 610 can be performed using a variety of approaches. For example, in an embodiment, step 610 can involve a user input that selects a particular flow. In an embodiment, 610 can involve the selection of one or more (e.g., a subset) of flows based on selection criteria and/or a policy. For example, when the first packet of a flow matching the selection criteria/policy is encountered, the flow can be registered with the monitoring service.

In an embodiment, step 610 includes step 610A.

At step 610A, configure one or more switches (and/or other network elements, e.g., routers, gateways, and so forth) to send flow data (i.e. traffic statistics) when they encounter packets pertaining to the flow. In an embodiment, the one or switches are instructed to send the flow data as time series data.

At step 620, collect flow traffic information. Thus, in an embodiment, step 620 can involve the monitoring service receiving the traffic data from the switches.

In an embodiment, step 620 includes step 620A and 620B.

At step 620A, update the traffic information for the flow, based on the collected flow traffic information. Thus, in an embodiment, when traffic data pertaining to a flow is received by the monitoring service, the relevant traffic patterns maintained for the flow by the service are updated with the new information. The traffic information can be updated periodically. The periodic interval can be a parameter and can vary across flows. Furthermore, the periodic interval can be changed dynamically based on, for example, flow history or information about the traffic type of the flow.

At step 620B, build one or more models representative of the expected behavior of the network flow. In an embodiment, the model is independent of the collected flow traffic information. Data generated by and/or otherwise associated with the model (e.g., time series data) can be used in a similarity computation (at step 630A) to evaluate the QoS of the network flow. In another embodiment, the model is obtained from an external source and can be used by method 600, e.g., at step 630A.

At step 630, analyze the collected data and report the results of the analysis.

In an embodiment, step 630 includes step 630A.

At step 630A, compute a similarity of the times series data. In an embodiment, step 630A can involve computing a similarity between the time series data recently collected for the network flow (e.g., from two or more network elements at two or more respective locations) and/or time series data generated by and/or otherwise associated with a model representative of the expected behavior of the network flow.

In an embodiment, the analysis conducted by the monitoring service looks at the history of a given flow to decide if there are any anomalies in the flow's traffic. For each pair of traffic patterns maintained by the service, the analysis determines how well the two series match. A good match indicates that there is not an anomaly. A poor match indicates a network problem such as packet loss or delay. The criteria to decide when to flag a flow as having problems can be based on thresholds customized to the type of flow. Thus, in an embodiment, step 630 can involve indicating whether or not an anomaly exists.

At step 640, determine if the analysis results are favorable (i.e., an anomaly does not exist). If so, then the method returns to step 620. Otherwise, the method proceeds to step 650.

At step 650, perform a diagnostic action and/or a corrective action with respect to the network flow to diagnose and/or overcome any degradation in the Quality of Service. The method 600 then returns to step 620. Exemplary diagnostic actions can include, but is not limited to, configuring additional forwarding elements (e.g., switches) to provide flow information, configuring flow elements to provide higher granularity flow information (e.g., every packet instead of every Nth packet), and feeding received flow information to additional analysis. Exemplary corrective actions can include, but are not limited to, restarting network elements, reconfiguring network elements and modifying forwarding and routing table entries. Additionally, corrective action in the cloud can include redirecting traffic around congested areas. This redirection can be achieved by changing routing in the network.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
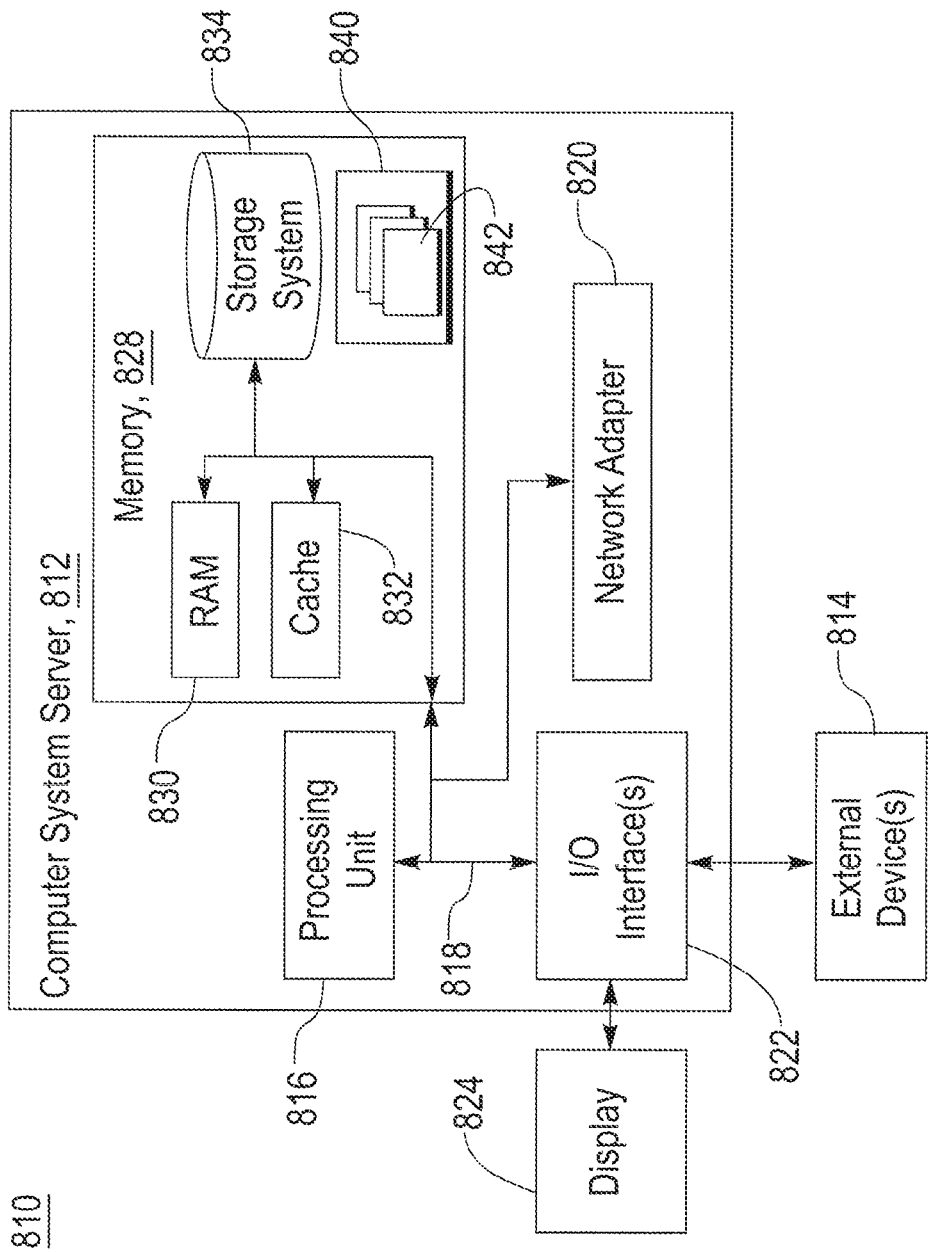
FIG. 8 shows an exemplary cloud computing node 810, in accordance with an embodiment of the present principles.

Referring now to FIG. 8, a schematic of an example of a cloud computing node 810 is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
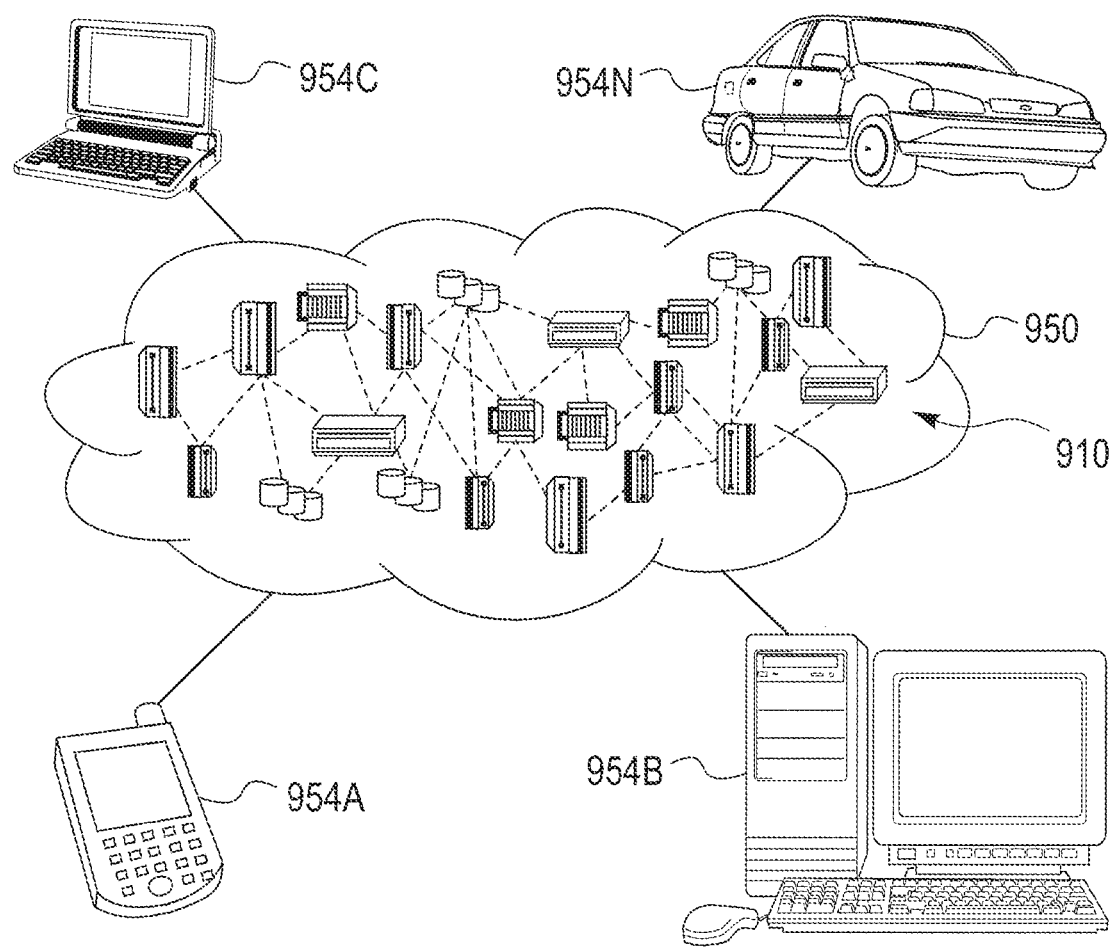
FIG. 9 shows an exemplary cloud computing environment 950, in accordance with an embodiment of the present principles.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
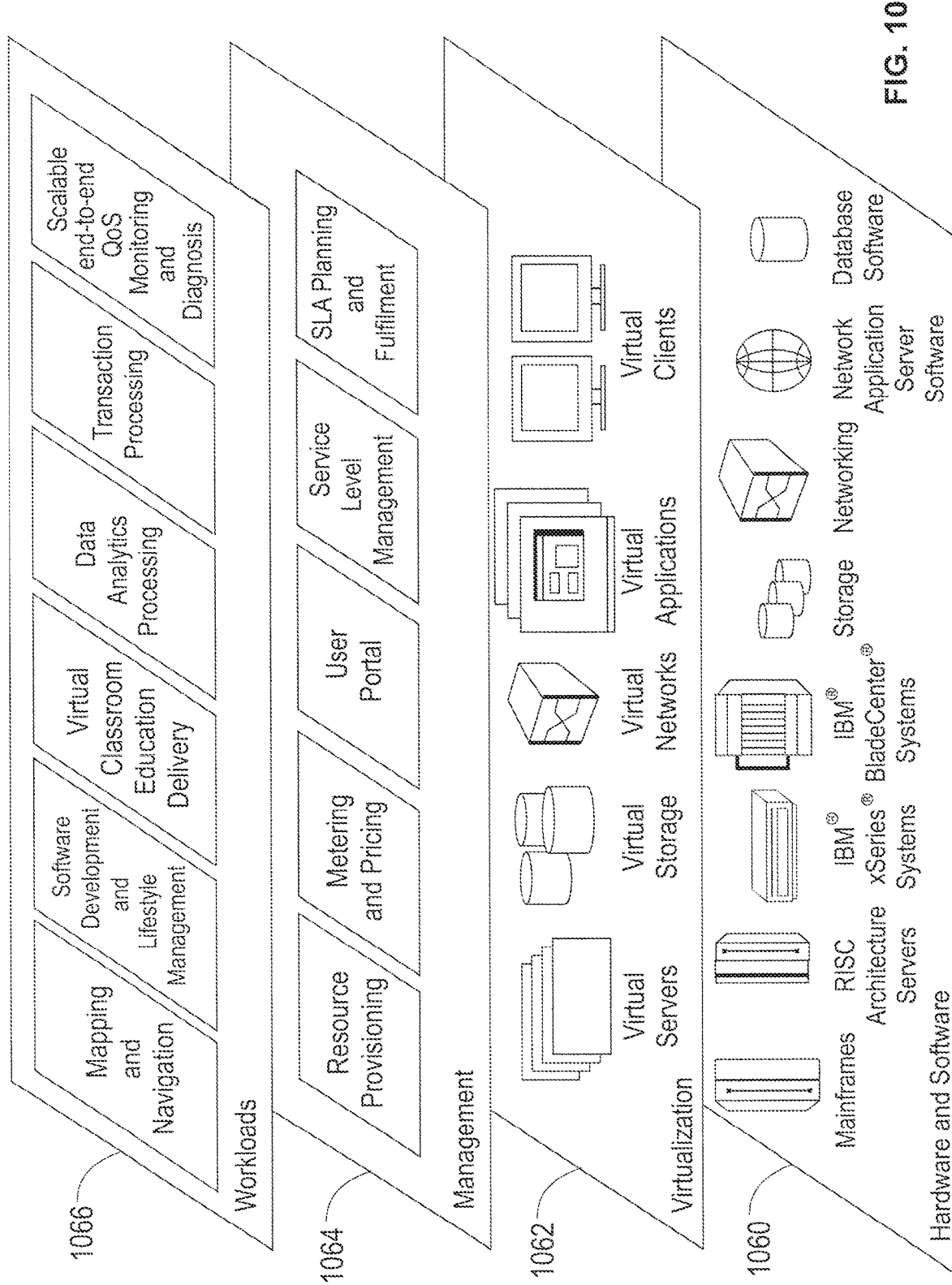
FIG. 10 shows exemplary abstraction model layers, in accordance with an embodiment of the present principles.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and scalable end-to-end Quality of Service (QoS) monitoring and diagnosis in Software Defined Networks (SDNs).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for detecting and mitigating Quality of Service degradation in a network flow, the method comprising:
    configuring at least two network elements of a plurality of network elements located at respective positions on a path of a network flow, registered with a network flow monitoring service, to report statistical information pertaining to the network flow;
    collecting, by a monitoring element, time series data representing the statistical information, the time series data being collected from the at least two network elements on the path of the network flow;
    indicating, by the monitoring element, Quality of Service degradation in the network flow based on a similarity of the time series data to expected time series data, that relates to a portion of the path between the at least two network elements, being less than a specified similarity threshold; and
    triggering, by the monitoring element, at least one action that configures at least one network element of the plurality of network elements to mitigate the indicated Quality of Service degradation.

2. The method of claim 1, further comprising configuring, by the monitoring element, the at least two network elements to report the time series data, including configuring the at least two network elements to sample only a subset of traffic associated with the network flow.

3. The method in claim 1, wherein the statistical information comprises a total number of packets associated with the network flow that have been transmitted.

4. The method in claim 1 wherein the statistical information comprises a total number of bytes associated with the network flow that have been transmitted.

5. The method in claim 1, wherein the statistical information comprises a number of packets associated with the network flow transmitted per a given unit of time.

6. The method in claim 1, wherein the statistical information comprises a number of bytes associated with the network flow transmitted per a given unit of time.

7. The method in claim 1, further comprising setting the specified similarity threshold based on a historical variation of the similarity of the time series data from the at least two network elements for the network flow.

8. The method in claim 1, further comprising setting the specified similarity threshold based on at least one of a protocol of the network flow and an application for which the network flow is generated.

9. The method of claim 1, wherein one of the at least two network elements is at an intermediate position on the path in between a source and a destination and another one of the at least two network elements is at the source, and wherein a path portion subsequent to the intermediate position is automatically identified without explicit analysis as being a problem source for the Quality of Service when the similarity of the time series data between the intermediate position and the source is above the specified similarity threshold.

10. The method of claim 1, further comprising automatically registering, by the monitoring element based on the network flow meeting one or more registration criterion, the network flow with a network flow monitoring service implemented by the monitoring element.

11. The method of claim 1, wherein triggering at least one action further includes performing at least one operation selected from the group consisting of: configuring additional network elements of the plurality of network elements to report additional time series data and configuring the at least two network elements to provide higher granularity network flow information.

12. The method of claim 1, wherein triggering at least one action includes performing at least one operation selected from the group consisting of: restarting at least one of the at least two network elements, reconfiguring at least one of the at least two network elements, modifying forwarding and routing table entries, and redirecting traffic associated with the network flow around congested area.

13. The method of claim 1, further comprising aggregating at least portions of a plurality of network flows having a same path to provide scaling of the method over the plurality of network flows.

14. The method of claim 1, further comprising using the time series data for a similarity computation relating to a portion of the path to automatically identify another portion of the path as causing the Quality of Service degradation without having to perform the similarity computation for the other portion of the path.

15. The method of claim 1, wherein the at least two network elements are hardware network elements including at least one of a switch, a router, and a gateway.

16. A non-transitory article of manufacture tangibly embodying a computer readable program, which, when executed, causes a computer to:

configure at least two network elements of a plurality of network elements located at respective positions on a path of a network flow, registered with a network flow monitoring service, to report statistical information pertaining to the network flow;

collect time series data representing the statistical information, the time series data being collected from the at least two network elements on the path of the network flow;

indicate Quality of Service degradation in the network flow based on a similarity of the time series data to expected time series data, that relates to a portion of the path between the at least two network elements, being less than a specified similarity threshold; and trigger at least one action that configures at least one network element of the plurality of network elements to mitigate the indicated Quality of Service degradation.

17. The non-transitory article of manufacture of claim 16, wherein the computer readable program further causes the computer to select the model based on at least one of a size of, an inter-arrival time of, and one or more network header values of network packets associated with the network flow.

18. A system for detecting and mitigating Quality of Service degradation in a network flow, the system comprising:

a hardware, processor-based monitoring element, configured to:

configure at least two network elements of a plurality of network elements located at respective positions on a path of a network flow, registered with a network flow monitoring service, to report statistical information pertaining to the network flow;

collect time series data representing the statistical information, the time series data being collected from the at least two network elements on the path of the network flow;

indicate Quality of Service degradation in the network flow based on a similarity of the time series data, that relates to a portion of the path between the at least two network elements, to expected time series data being less than a specified similarity threshold; and trigger at least one action that configures at least one network element of the plurality of network elements to mitigate the indicated Quality of Service degradation.

* * * * *